(12) United States Patent
Chang et al.

(10) Patent No.: US 8,477,241 B2
(45) Date of Patent: Jul. 2, 2013

(54) MULTI-PROJECTOR SYSTEM AND METHOD

(75) Inventors: Nelson Liang An Chang, San Jose, CA (US); Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/259,726

(22) PCT Filed: May 29, 2009

(86) PCT No.: PCT/US2009/045711
§ 371 (c)(1),
(2), (4) Date: Sep. 23, 2011

(87) PCT Pub. No.: WO2010/138128
PCT Pub. Date: Dec. 2, 2010

(65) Prior Publication Data
US 2012/0019670 A1    Jan. 26, 2012

(51) Int. Cl.
*H04N 17/02*    (2006.01)
*H04N 5/66*    (2006.01)
*H04N 3/22*    (2006.01)

(52) U.S. Cl.
USPC ................ 348/383; 348/745; 348/189

(58) Field of Classification Search
USPC ........ 348/383, 36, 38, 588, 189, 745; 353/69, 353/70, 94, 31; 345/1.3
See application file for complete search history.

(56) References Cited

U.S. PATENT DOCUMENTS

| | | | |
|---|---|---|---|
| 5,384,912 A * | 1/1995 | Ogrinc et al. | 345/501 |
| 6,570,623 B1 * | 5/2003 | Li et al. | 348/383 |
| 6,717,625 B1 * | 4/2004 | Thielemans | 348/745 |
| 6,814,448 B2 * | 11/2004 | Ioka | 353/69 |
| 7,038,727 B2 * | 5/2006 | Majumder et al. | 348/383 |
| 7,154,515 B2 * | 12/2006 | Donahue et al. | 345/686 |
| 7,796,134 B2 * | 9/2010 | Vesely et al. | 345/427 |
| 7,866,832 B2 * | 1/2011 | Jaynes et al. | 353/121 |
| 7,907,792 B2 * | 3/2011 | Harville | 382/284 |
| 7,940,329 B2 * | 5/2011 | Houmeau et al. | 348/383 |
| 2002/0027608 A1 * | 3/2002 | Johnson et al. | 348/383 |
| 2004/0184011 A1 | 9/2004 | Raskar et al. | |
| 2005/0134599 A1 * | 6/2005 | Nayar et al. | 345/589 |
| 2005/0195373 A1 * | 9/2005 | Feigel et al. | 353/94 |
| 2007/0291185 A1 * | 12/2007 | Gelb et al. | 348/745 |
| 2008/0043100 A1 | 2/2008 | Sobel et al. | |
| 2008/0095468 A1 * | 4/2008 | Klemmer et al. | 382/285 |
| 2009/0009658 A1 * | 1/2009 | Aufranc et al. | 348/383 |
| 2009/0213337 A1 * | 8/2009 | Kondo et al. | 353/31 |

FOREIGN PATENT DOCUMENTS
JP        2006014356        1/2006

OTHER PUBLICATIONS
International Search Report, PCT US2009/045711, Feb. 2, 2010, 11 pages.

* cited by examiner

*Primary Examiner* — Victor Kostak (57) ABSTRACT

A method for reducing view-dependent artifacts in a multi-projector system includes the steps of measuring, from multiple viewpoints, projection characteristics of an image projected by a multi-projector system, estimating view-dependent projection parameters that can reduce view-dependent artifacts, and computing rendering parameters for each projector so as to reduce the view-dependent artifacts.

19 Claims, 7 Drawing Sheets

MULTI-PROJECTOR SYSTEM AND METHOD

BACKGROUND

Multi-projector systems have been developed to project multiple video images to a common display location, such as a screen or wall, to produce a composite display. A composite display is one in which a single image is produced using multiple projectors, with each projector producing a portion or component of the total image. These display systems can be configured to allow multiple sub-frames to overlap completely, not at all, or anything in between, or to provide multiple separate composite images. Yet another application for a multiple projector system is the production of three-dimensional ("3D") stereoscopic images.

Multi-projector displays have been developed that use a camera to measure appropriate compensation parameters (e.g. geometry, color, luminance, etc) to form a seamless image. The compensation parameters are estimated from camera measurements taken typically at only one viewpoint. However, significant artifacts in the form of over-compensation can appear for screens that are non-Lambertian (e.g. gain>1) and for viewing angles different from the camera position, thereby diminishing the perceived image quality and usefulness of such a display. This observation can be true for many sorts of multi-projector displays, including front-projected, rear-projected, and stereoscopic 3-D displays.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein:

FIG. 2 is an illustration of relative brightness of a composite display screen when viewed from straight on;

DETAILED DESCRIPTION

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As used herein, directional terms, such as "top," "bottom," "front," "back," "leading," "trailing," etc, are used with reference to the orientation of the figures being described. Because components of various embodiments disclosed herein can be positioned in a number of different orientations, the directional terminology is used for illustrative purposes only, and is not intended to be limiting.

As used herein, the term "sub-frame" refers to that portion of a display image that is produced by a single projector. A complete display image produced by multiple sub-frames from multiple projectors is referred to as a "composite image." It is to be understood that a composite image can be produced by a sub-group of projectors (i.e. fewer than all of the projectors) in a multiple projector system.

Figure 1:
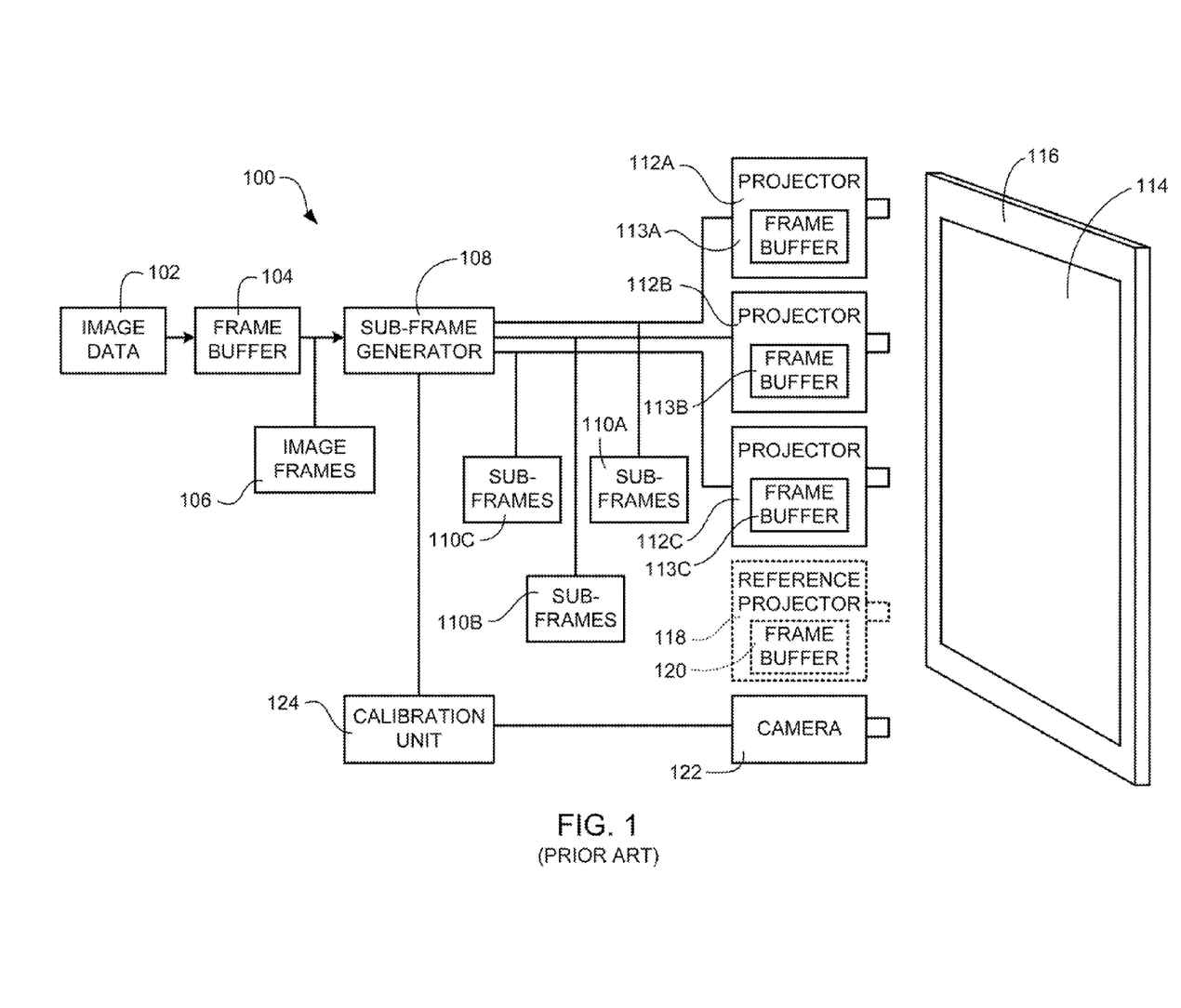
FIG. 1 is a block diagram of one embodiment of an image display system configured to produce a composite image using multiple projectors.

FIG. 1 is a block diagram illustrating an embodiment of a prior art multi-projector image display system 100. The image display system 100 processes image data 102 and generates a corresponding displayed image 114. The displayed image 114 is defined to include any pictorial, graphical, or textural characters, symbols, illustrations, or other representations of information.

In one embodiment, the image display system 100 includes an image frame buffer 104, a sub-frame generator 108, projectors 112A-112C (collectively referred to as projectors 112), camera 122, and a calibration unit 124. The image frame buffer 104 receives and buffers image data 102 to create image frames 106. The sub-frame generator 108 processes the image frames 106 to define corresponding image sub-frames 110A-110C (collectively referred to as sub-frames 110). In one embodiment, for each image frame 106, the sub-frame generator 108 generates one sub-frame 110A for projector 112A, one sub-frame 110B for projector 112B, and one sub-frame 110C for projector 112C. The sub-frames 110A-110C are received by the projectors 112A-112C, respectively, and stored in the image frame buffers 113A-113C (collectively referred to as image frame buffers 113), respectively. The projectors 112A-112C project the sub-frames 110A-110C, respectively, onto the target surface 116 to produce the displayed image 114 for viewing by a user.

The image frame buffer 104 includes memory for storing image data 102 for one or more image frames 106. Thus, the image frame buffer 104 constitutes a database of one or more image frames 106. The image frame buffers 113 also include memory for storing sub-frames 110. Examples of image frame buffers 104 and 113 include non-volatile memory (e.g., a hard disk drive or other persistent storage device) and may include volatile memory (e.g., random access memory (RAM)).

The sub-frame generator 108 receives and processes image frames 106 to define a plurality of image sub-frames 110. The sub-frame generator 108 generates sub-frames 110 based on the image data in image frames 106. In one embodiment, the sub-frame generator 108 generates image sub-frames 110 having a resolution that matches the resolution of the projectors 112, which is less than the resolution of image frames 106 in one embodiment. The sub-frames 110 each include a plurality of columns and a plurality of rows of individual pixels representing a subset of an image frame 106.

The projectors 112 receive image sub-frames 110 from the sub-frame generator 108 and, in one embodiment, simultaneously project the image sub-frames 110 onto the target surface 116 at overlapping and/or spatially offset positions to produce the displayed image 114. In one embodiment, the display system 100 is configured to give the appearance to the human eye of high-resolution displayed images 114 by displaying overlapping lower-resolution sub-frames 110 from multiple projectors 112. These overlapping sub-frames can be spatially shifted or have arbitrary geometric transformations with respect to one another. In one embodiment, the projection of overlapping sub-frames 110 gives the appearance of enhanced resolution (i.e., higher resolution than the sub-frames 110 themselves). In another embodiment, the projector sub-frames provide an effectively higher resolution display through tiling (i.e. minimally overlapping adjacent projector images). In still another embodiment, the projector sub-frames are arbitrarily combined to form an overlapping and tiled configuration. Approaches have been developed for determining appropriate values for the sub-frames 110 so that the resulting displayed image 114 produced by the projected sub-frames 110 is close in appearance to how the high-resolution image (e.g., image frame 106) from which the sub-frames 110 were derived would appear if displayed directly.

It will be understood by a person of ordinary skill in the art that the functions performed by the sub-frame generator 108 may be implemented in hardware, software, firmware, or any combination thereof. The implementation may be via a microprocessor, programmable logic device, or state machine. Components of the system may reside in software on one or more computer-readable media devices. The term computer-readable media as used herein is defined to include any kind of memory, volatile or non-volatile, such as floppy disks, hard disks, CD-ROMs, flash memory, read-only memory, and random access memory.

Also shown in FIG. 1 is a reference projector 118 with an image frame buffer 120. The reference projector 118 is shown in hidden lines in FIG. 1 because, in one embodiment, the projector 118 is not an actual projector, but rather is a hypothetical high-resolution reference projector that is used in an image formation model for generating optimal sub-frames 110. In one embodiment, the location of one of the actual projectors 112 can be defined to be the location of the reference projector 118. The display system 100 can also include a camera 122 and a calibration unit 124, which can be used to automatically determine a geometric mapping between each projector 112 and the reference projector 118.

The image display system 100 can include hardware, software, firmware, or a combination of these. In one embodiment, one or more components of the image display system 100 (e.g. the frame buffer 104, sub-frame generator 108 and calibration unit 124) are included in a computer, computer server, or other microprocessor-based system capable of performing a sequence of logic operations, and having system memory. Such a system is generally referred to herein as a "controller" for the multi-projector system. In addition, processing can be distributed throughout the system with individual portions being implemented in separate system components, such as in a networked or multiple computing unit environment (e.g. clustered computers).

As noted above, the camera 122 is coupled to the calibration unit 124, and is used to determine compensation parameters for geometry, color, luminance, etc., to form a seamless image. The compensation parameters are estimated from camera measurements taken typically at only one viewpoint. For Lambertian screens (e.g. gain≦1, or equal reflectivity regardless of viewing angle), this single sample can be representative of all viewing angles and thus no degradation in perceived image quality.

However, significant artifacts in the form of over-compensation can appear for screens that are non-Lambertian and for viewing angles different from the camera position, thereby diminishing the perceived image quality for such a display. This is particularly apparent when using multiple projectors with different optical paths, whereby their different incident angles with respect to the display surface leads to the hot spotting. This observation is true for any sort of multi-projector display, including front projected, rear projected (which can have severe view-dependent hot spotting issues), multi-view displays, and stereoscopic 3-D, whether through complementary polarization (which typically uses non-Lambertian screens) or active shutter glasses. It is also possible to observe such effects with non-planar surfaces that interreflect.

Figure 2:
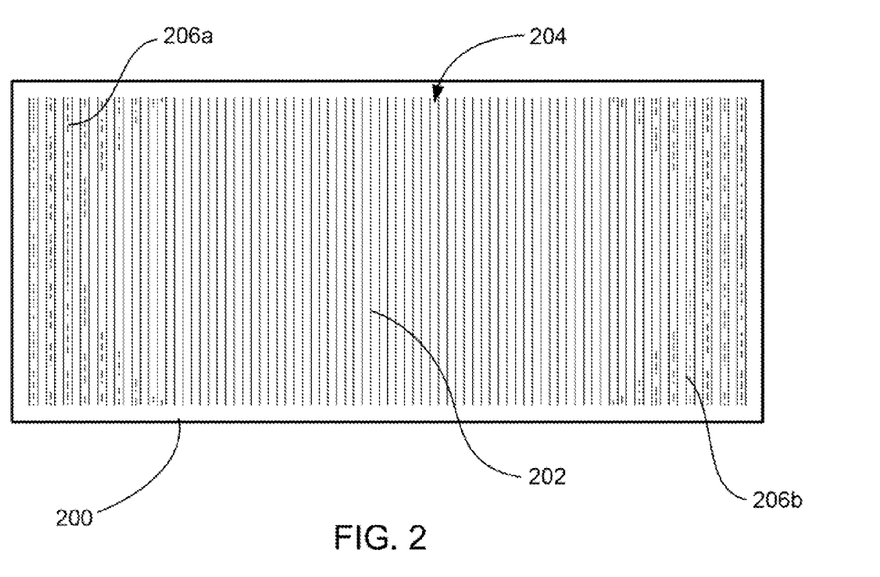

Shown in FIG. 2 is an illustration of a display screen 200 of a multi-projector system when viewed from substantially straight-on, or when viewed from a vantage point that is substantially the same as the viewpoint of a calibration camera. The central region 202 of the wide-screen composite image 204 is substantially visually uniform. Since the human eye is not highly sensitive to slowly varying changes, slight vignetting or changes in brightness, such as toward the edges 206a, b of the image 204, can be tolerated.

Figure 3:
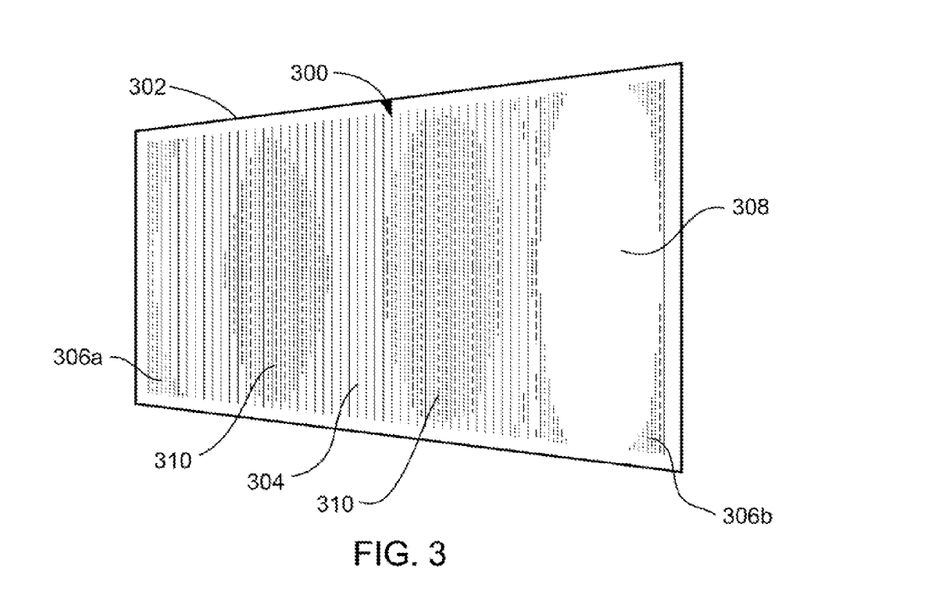
FIG. 3 is an illustration of relative brightness of a composite display when viewed from an angle, showing hotspots and darker regions.

However, when the display image is viewed from an angle that differs significantly from straight on or that differs from the vantage point of the calibration camera, hot spots and view-dependent artifacts can appear. Shown in FIG. 3 is an illustration of relative brightness of a composite display image 300 when the screen 302 is viewed from an angle. In this view, it can be seen that many portions 304 of the image have approximately the desired brightness. However, in addition to some slightly darkened regions 306a, b at the extreme right and left edges of the image, the image includes an extremely bright region or hot spot 308 near the right side, and some other darkened regions 310 across the image.

Advantageously, a system and method for reducing hot spots and view-dependent artifacts in a multi-projector system has been developed. The system and method disclosed herein uses camera measurements from multiple viewpoints of the multi-projector display, and automatically integrates the measurements to form a more optimal display result across wider viewing angles, instead of achieving the most seamless display from the viewpoint of the calibration camera. The appearance of projector hot spotting and view-dependent artifacts can thus be mitigated over the range of desired viewing angles.

Figure 4:
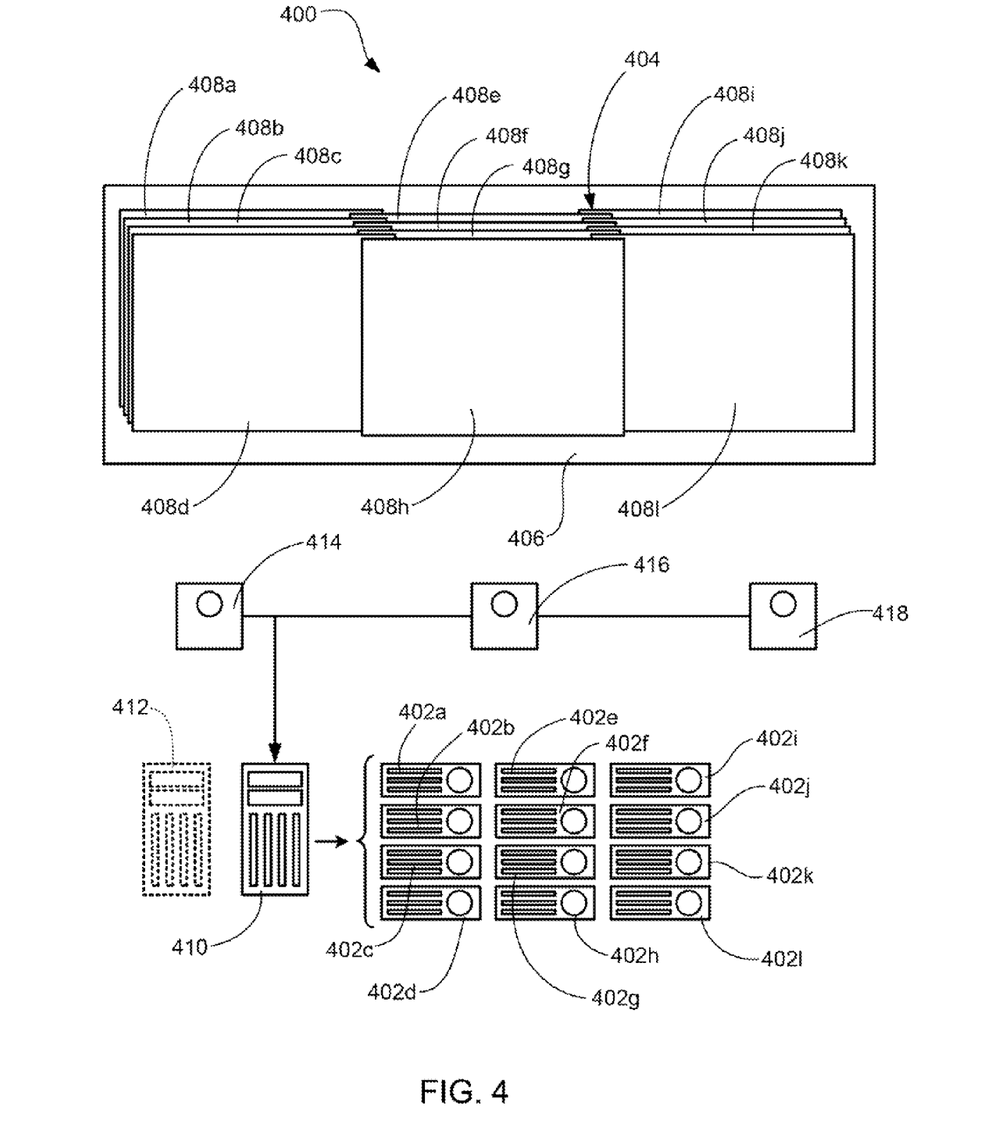
FIG. 4 is a diagram of an embodiment of a multi-projector system and a composite display produced thereby.

Shown in FIG. 4 is an embodiment of a multi-projector system 400 that includes twelve projectors 402a-l, all oriented to produce a single composite image 404 on a display surface 406. It is to be appreciated that, while the embodiment shown in FIG. 4 includes twelve projectors, the system and method disclosed herein applies to any multi-projector system with two or more projectors. As shown in this example, the twelve projectors produce twelve sub-frames, labeled 408a-l, which in this figure are combined together to provide a single wide format composite image 404. While the superimposed sub-frames 408 are shown spatially offset from each other in FIG. 4, this is for illustrative purposes, and does not necessarily correspond to the actual positioning of sub-frames to produce the composite image 404. It is also to be appreciated that the actual physical location or grouping of projectors in a multi-projector system can vary. For example, while the projectors 402 in FIG. 4 are physically arranged in three groups of four and the sub-frames on the display are generally in three groups of four, the projectors could be arranged in a different physical position, and any of the twelve projectors 402a-l can be configured to produce any one of the twelve sub-frames 40a-l.

The twelve projectors 402 are controlled by a controller system, which can be a computer, computer server, or other microprocessor-based system having a processor and system memory, and capable of driving the projectors to produce the composite image, as discussed above. The controller is designated generally at 410. However, as noted above, the controller system can include multiple computing devices, such as a first controller computer 410 and a second controller device 412, that are networked or clustered with the first controller computer.

Figure 5:
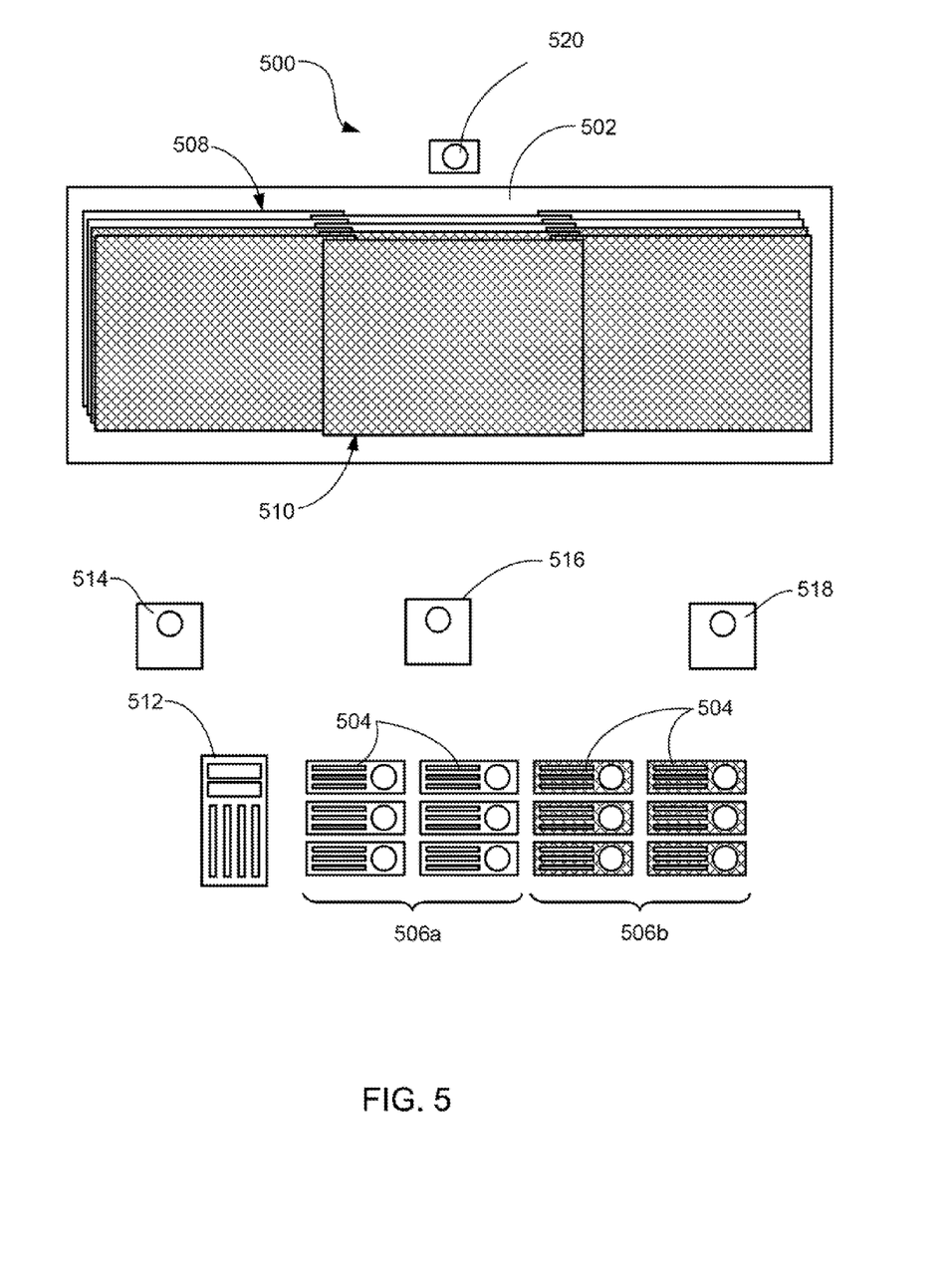
FIG. 5 is a diagram of an embodiment of a multi-projector system and display in which the projectors are divided into multiple sub-groups, to produce a single 3D stereoscopic composite image.

The multi-projector systems in FIGS. 1 and 4 are shown producing a single composite image using all available projectors. However, it has also been found that it can be desirable to divide a group of projectors in a multi-projector system into sub-groups. Such systems can be used to provide stereoscopic/3D displays. One embodiment of a multi-projector system that includes projectors divided into sub-groups is shown in FIG. 5. This embodiment provides a stereoscopic/3D display 500 in which two visual channels are superimposed on the same physical display surface 502. Specifically, this system includes twelve projectors 504, divided into two sub-groups 506a, b. The first sub-group 506a corresponds to the "left" channel, projecting the content that should be sent to the viewers' left eye, while the second sub-group 506b corresponds to the channel for the "right" eye. Both channels are superimposed on each other on a common display 502, providing a left eye composite display 508, and a right eye composite display 510, each of these composite displays being produced by images from half the projectors 504 in the multi-projector system. The projectors are driven by a controller system 512, which receives feedback from at least one calibration camera 514, in the manner discussed above. Using any of a variety of available 3D display technologies for each sub-group 506 (e.g. polarized glasses, etc), the resulting system provides a wide format stereoscopic display having high image quality, but using multiple relatively inexpensive projectors. Other embodiments can include multiple discrete screens and these can provide superimposed images, tiled images, stereoscopic images, etc., and these can be optimized for different characteristics, such as brightness, contrast, color, etc.

Advantageously, the system 400 in FIG. 4 includes multiple calibration camera positions 414, 416, 418, for feedback to the calibration unit (124 in FIG. 1) to allow adjustment of the projectors 402 under control of the controller 410 or clustered controller group. Likewise, the system 500 shown in FIG. 5 includes multiple calibration camera positions 514, 516 and 518. These cameras are positioned at different viewpoints. For example, a central camera can be positioned to view the respective display from a substantially straight-on point of view, with a second camera located at a point of view 25° to the right with respect to the screen, and a third camera located 40° to the left. It is to be appreciated that these positions are only exemplary. Any number of camera positions/orientations can be used, and the positions/orientations can be arbitrary. The system and method disclosed herein uses camera measurements from multiple viewpoints of the multi-projector display and automatically integrates the measurements to form a more optimal display result across wider viewing angles. The appearance of projector hot-spotting and view-dependent artifacts will thereby be mitigated over the range of desired viewing angles.

Figure 6:
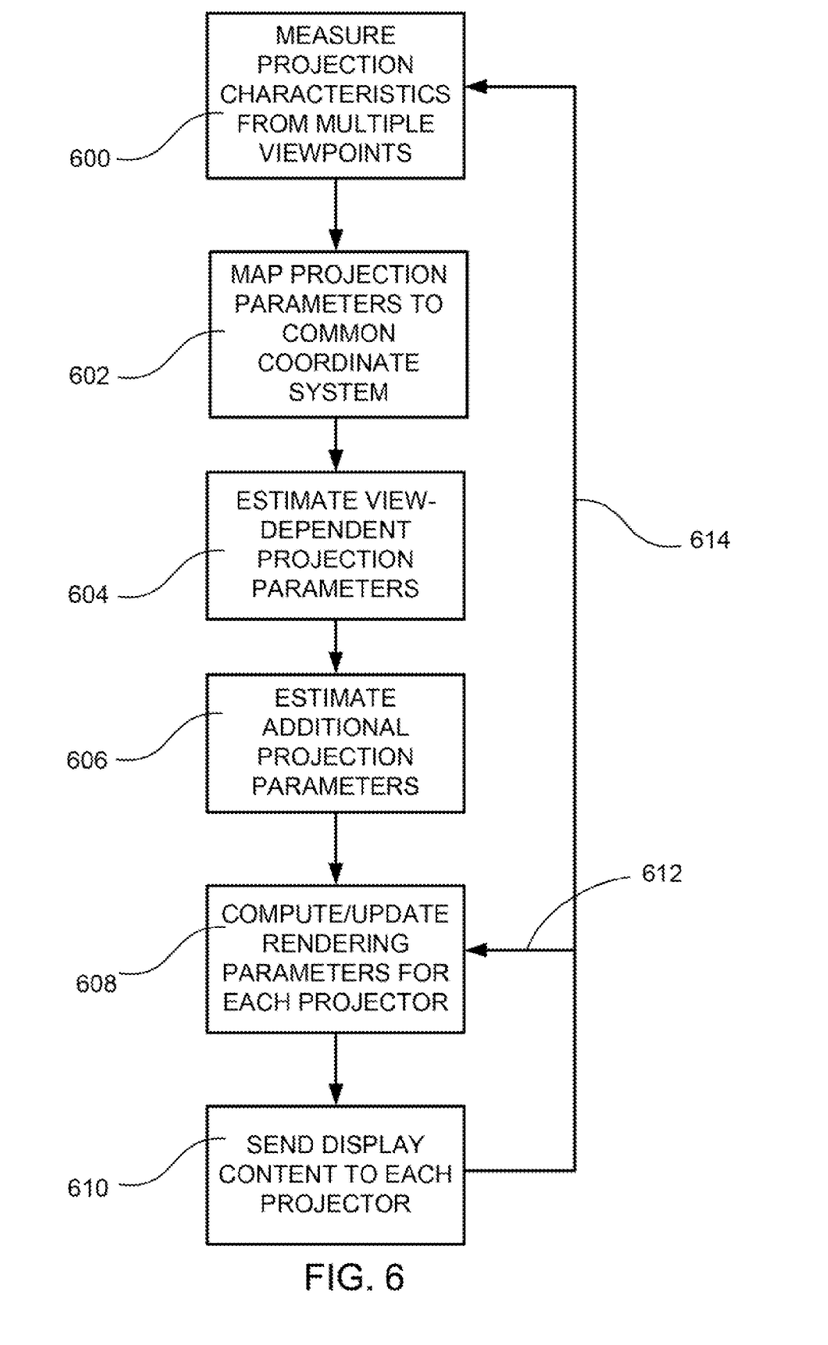
FIG. 6 is a flowchart outlining the steps in an embodiment of a method for reducing hot spots and view-dependent artifacts in a multi-projector system.

Shown in FIG. 6 is a flowchart outlining the steps in one embodiment of a method for reducing hot spots and view-dependent artifacts in a multi-projector system. In this method, the display system is assumed to be a multi-projector display system like that shown and described in any of FIG. 1, 4 or 5, consisting of a collection of projectors, multiple graphic cards, one or more PCs clustered together, multiple calibration cameras positions, and one or more display surfaces. The method has three general phases: a measurement phase, a modeling phase, and a rendering phase.

The first step is part of the measurement phase, and involves measuring projection characteristics from multiple viewpoints (step 600). For any number of camera viewpoints (this could be done simultaneously with multiple calibrated cameras, or sequentially with a single camera moved to different viewpoints, or combinations thereof), each projector projects one or more patterns to encode various parameters (including geometry, color, luminance, etc). The microprocessor control system records the measurements for each projector and for each camera viewpoint.

The next steps are part of the modeling phase. First, for each projector, the measured projector parameters from all the camera viewpoints are remapped to a common coordinate system (e.g. the positional coordinates for one of the cameras as a reference, or some other reference point) (step 602). The results are then represented as a function of the measured parameters, in order to estimate the view-dependent projection parameters (step 604). For example, all the measured luminance profiles are remapped to a common coordinate system for a given projector via parametrization with respect to viewing angle. One approach is then to take the weighted average or median per pixel location to form a single representative luminance profile that removes much of the view dependent effects. Another embodiment incorporates into the image formation model a weighted reflectance function of the projector parameters that depends on the viewing angle. In the end, a more representative set of projector parameters are estimated that reduces the view dependent and hot spotting effects of non-Lambertian screens.

One extension of this step is to estimate a 3-D position and orientation of the camera viewpoints and the projectors. In this case, one can factor the actual 3-D geometry of the measured parameters and form a parameterized function of the measured projector parameter (e.g. luminance profile as a function of viewing angle). This approach can lead to an estimate of the surface normals as well as the more general transfer functions (e.g. bidirectional reflectance function (BRDF), the reflectance field) of the display surface.

Once the projector parameters have been estimated, additional compensation parameters for the multi-projector display can be estimated or modeled using steps that are known to those of skill in the art (step 606). Examples of these modeling and measurement steps include calibrating the projection brightness of each projector or sub-group to be as uniform as possible. In one approach, the image pipeline for the multi-projector system uses a sophisticated image formation model and automatic measurement steps via feedback through the calibration camera(s), including measuring the inter-projector geometry, including keystone and other corrections, luminance, color, black offset, etc. An embodiment of these modeling and measurement steps are outlined in N. Damera-Venkata, N. L. Chang, J. M. DiCarlo, "A Unified Paradigm for Scalable Multi-Projector Displays," IEEE Transactions on Visualization and computer Graphics, November-December 2007, and in U.S. Pat. Nos. 7,306,341, and 7,443,364, and United States Patent Application Publication Nos. 2007/0091277, 2007/0097334, 2008/0002160, 2008/0024469, 2008/0024683, and 2008/0143978, the disclosures of which are incorporated by reference herein.

It is also possible to factor in more of the viewpoints during the optimization. For example, in one embodiment, the multiple measurements are used to estimate a weighted reflectance function (which can be parametric or nonparametric, interpolated as needed), whereby the desired viewing angles of the final display are weighted more heavily to achieve a more optimal set of compensation parameters over those viewing angles. This weighted reflectance function can be used to solve directly for the compensation/rendering parameters for all relevant views. In another embodiment, each projector characteristic measurement is used to compute corresponding compensation parameters for each viewing angle, and these compensation parameters are combined in a weighted function of the viewing angle. The combining of parameters for multiple viewpoints can also be done by taking a median of the values, or by some other rank order statistic. In short, the system creates a reflectance function that is a robust combination of reflectance values from multiple viewpoints, whether that reflectance function is determined by a weighted average, median, truncated mean, or any other type of combination discussed herein or known to one of skill in the art.

The final steps are part of the rendering phase. Estimated compensation or rendering parameters are computed and/or updated for each projector (step 608) and the estimated compensation parameters are applied to send display content to each projector in real-time for subsequent imagery (step 610), as described in the references cited above. In other words, when it is desired to display some content, the computed rendering parameters are applied to every desired frame to determine how to adjust each projector's image so that the resulting image achieves the desired characteristics, with a reduction in hot spots and view-dependent artifacts. As indicated by arrow 612, the process can then repeat steps 608 and 610 to repeatedly compute rendering parameters and send display data to each projector. Alternatively, as indicated by arrow 614, the process can return to step 600 to recalibrate if desired. As a result of this method, the resulting display can have fewer view-dependent artifacts and less hot spotting than before.

Figure 7:
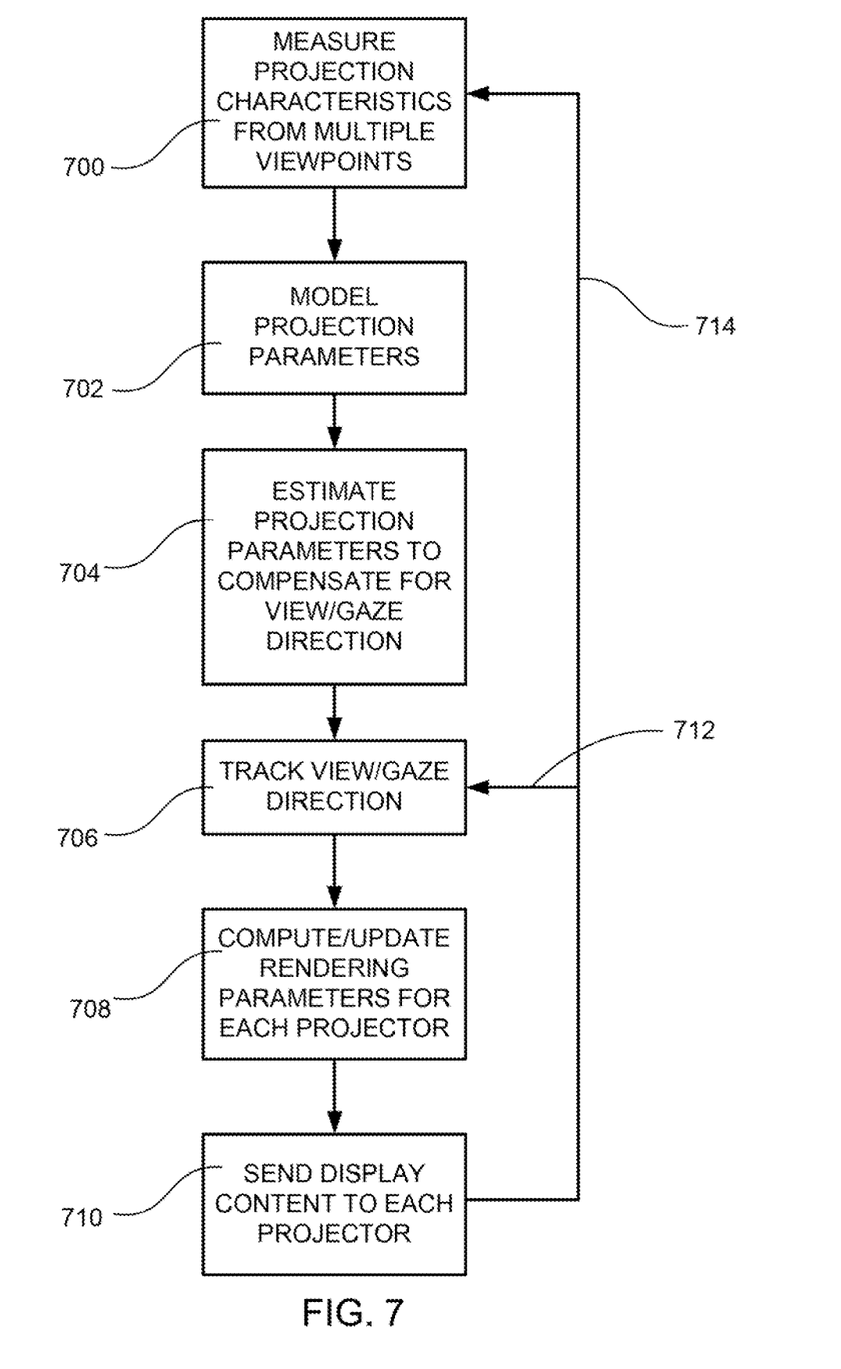
FIG. 7 is a flowchart outlining the steps in an alternative embodiment of a method for reducing hot spots and view-dependent artifacts in a multi-projector system using head/gaze tracking.

In another embodiment, the method disclosed herein can be extended to incorporate a gaze/head tracking capability. The steps in one embodiment of this method are shown in FIG. 7. Like the method outlined and described with respect to FIG. 6, this embodiment also includes a measurement phase, a modeling phase, and a rendering phase. The first step is part of the measurement phase, and involves measuring projection characteristics from multiple viewpoints, in the same way discussed above (step 700). Again, this can be done simultaneously with multiple calibrated cameras, or sequentially with a single camera moved to different viewpoints, or combinations thereof. Each projector projects one or more patterns to encode various parameters, and the microprocessor control system records the measurements for each projector and for each camera viewpoint.

The next step begins the modeling phase discussed above, and involves first modeling the projection parameters (step 702) by mapping the projection parameters to a common coordinate system, to produce results as a function of the measured parameters, in order to estimate the view-dependent projection parameters (step 704). In one embodiment, these steps are done in the manner outlined above, for example, by remapping all of the measured luminance profiles to a common coordinate system for each projector, then taking a weighted average or median per-pixel location to form a single representative luminance profile that removes the view-dependent effects. Alternatively, the measured luminance profiles can be used to form a weighted reflectance function that is dependent on viewing angle in the image formation model. This weighted reflectance function can be used to solve directly for the compensation/rendering parameters for all relevant views. Alternatively, the system can estimate projection parameters for each viewing angle and combine them (e.g. as a weighted average). The combining of parameters for multiple viewpoints can also be done by taking a median of the values, or by some other rank order statistic. Again, the system creates a reflectance function that is a robust combination of the reflectance from multiple viewpoints, whether by a weighted average, median, truncated mean, or any other type of combination discussed herein or known to one of skill in the art. Once the projector parameters have been estimated, additional compensation parameters for the multi-projector display are also estimated or modeled using steps discussed above.

The final steps are part of the rendering phase. During the rendering phase, estimated compensation or rendering parameters are computed and/or updated for each projector (step 708) and the estimated compensation parameters are applied to send display content to each projector in real-time for subsequent imagery (step 710), as described above. It is to be appreciated that the compensation parameters can be computed on-the-fly, or they can be pre-computed and stored in a lookup table based upon viewing angle. However, an additional step of head or gaze tracking (step 706) is added in this embodiment. The rendering step is thus modified to calibrate for multiple viewing angles and estimate training parameters as a function of viewing angle. During rendering, the head tracker estimates the user's viewing angle and updates the appropriate compensation parameters that lead to the best result from that viewpoint (the content can also be updated to create a motion-parallax correct display). The compensation parameters may be pre-computed or else computed on-the-fly upon receiving the user's viewing angle. Alternatively, projection parameters for multiple discrete viewpoints can be pre-computed and stored in memory. Then, the projection parameters for a given detected location can be obtained by interpolation between the stored values for intermediate views. This approach eliminates the need to store parameters for every view location.

Head tracking or gaze tracking can use a variety of techniques known by those of skill in the art, including Infrared (IR)-based cameras to track a person's eye movements, head-mounted rigs that operate by triangulating a signal to determine pose and orientation, etc. Such tracking systems can be configured using the type of components that are used in the well known Wii® game system made by Nintendo, for example. Other approaches to gaze-tracking can be used, such as facial detection systems that detect the position and orientation of a viewer's face, and also the gaze direction of the eyes.

Figure 8:
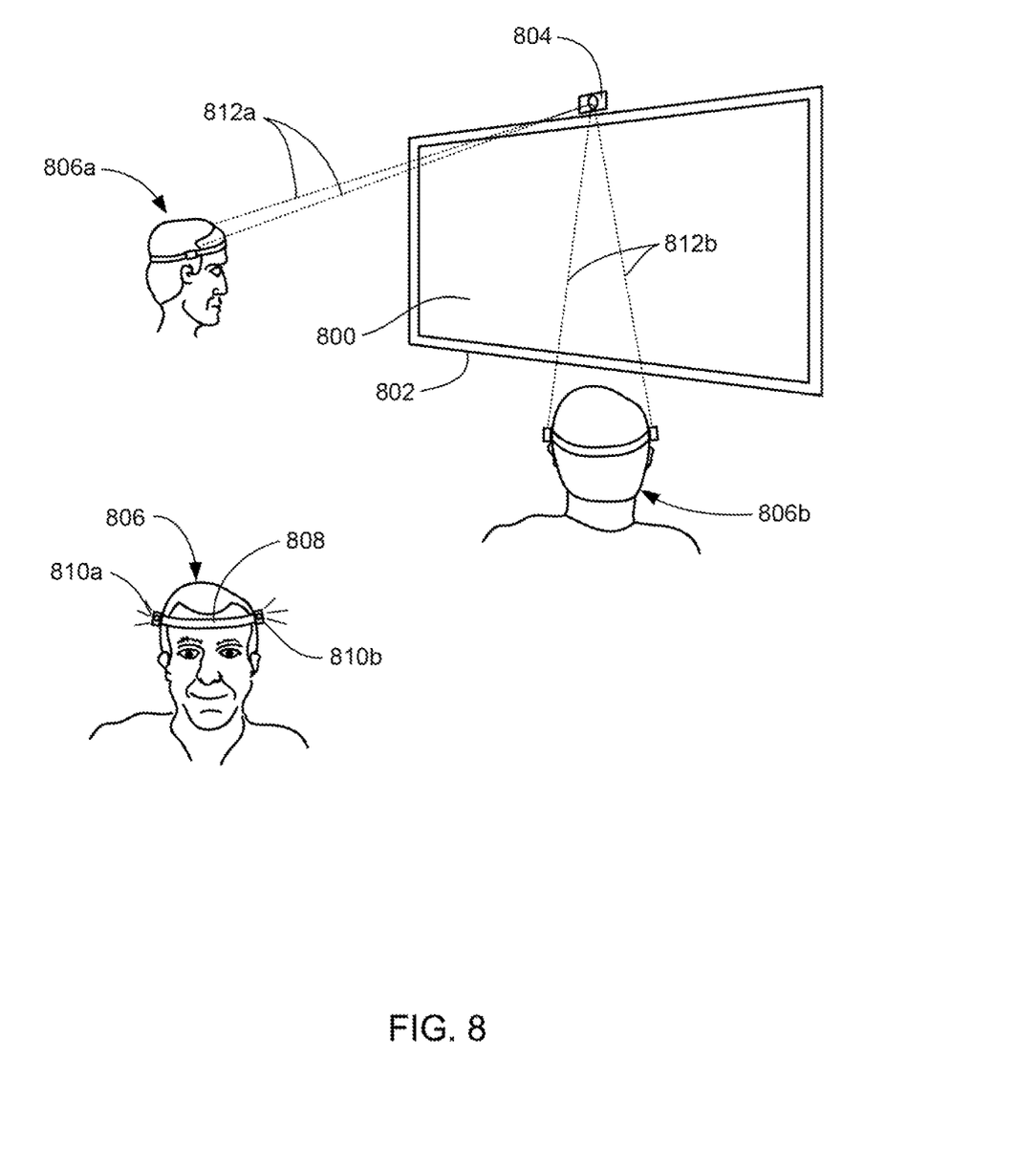
FIG. 8 illustrates a display of a projection system having a head and/or gaze tracking system for determining viewing position for purposes of display compensation.

One embodiment of a display with a head tracking system is shown in FIG. 8. A display image 800 is projected upon a display screen 802. Above the display screen is a head tracking sensor 804. While the multi-projector system is not shown in this view, a multi-projector system can be used to produce the display image 800. The multi-projector system 500 shown in FIG. 5 includes a head or gaze tracking sensor 520.

Returning to FIG. 8, a representative viewer 806 wears a headband 808 (or other device, such as a hat, eyeglasses, etc.) that carries a pair of lights 810a, b. The lights can be infrared lights, and the camera 804 can be an infrared camera that can detect light emanating from the lights. By wearing the headband 808, the location and head orientation of the viewer 806 can be determined based upon the intensity (closer lights provide greater intensity), size, position (right, left, up, down), relative spacing (a pair of lights closer together can indicate a viewer farther away or a turned head) and relative angle (representative of a tipped head) of the lights 810. Thus, the position of viewer 806a will provide a different light path (represented by dashed lines 812a) from the head-mounted lights to the camera 804 than the position of viewer 806b, which provides a different light path (represented by dashed lines 812b).

This head tracking system allows the associated control system to estimate the position of the viewer relative to the camera 804 and the display 802. It is to be appreciated that the gaze/head tracking configuration shown in FIG. 8 is only one of many possible gaze or head tracking systems that can be used with the system and method disclosed herein. Referring back to FIG. 7, the calibration technique records the calibration data (i.e. the multi-projector measurement and modeling steps 702, 704) with respect to an estimated viewing angle based upon the viewer position detected in step 706. It is also possible to parameterize the viewing angle and parameterize these results as a function of viewing angle, or else simply load in the closest calibration data to the estimated viewing angle can be.

As indicated by arrow 712, the process can then repeat steps 706-710 to repeatedly detect the viewer position and/or gaze direction, and compute rendering parameters and send display data to each projector. Alternatively, as indicated by arrow 714, the process can return to step 700 to recalibrate if desired. As a result of this method, the resulting display can have fewer view-dependent artifacts and less hot spotting than before.

This system and method takes advantage of camera measurements from multiple locations to mitigate view-dependent artifacts and hot spotting that can appear with multi-projector displays on non-Lambertian surfaces. It provides an improved result for the display over a wider range of viewing angles, which is especially desirable for polarized 3-D displays and rear projection multi-projector displays. In addition, this system and method facilitates an automatic measurement and calibration technique for improving the display.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A method for reducing view-dependent artifacts in a multi-projector system, the method being carried out by a computer device having a processor and system memory, comprising the steps of:
   measuring, from multiple viewpoints, and inputting into the computer, data relating to projection characteristics of each of a plurality of projectors of the multi-projector system, the plurality of projectors producing a composite image of an image frame;
   the computer remapping, for each projector, the projection characteristics from the multiple viewpoints to a common coordinate system;
   the computer estimating view-dependent projection parameters for each projector based on the remapped projection characteristics; and
   the computer computing rendering parameters for each projector based on the estimated view-dependent projection parameters so as to reduce view-dependent artifacts.

2. A method in accordance with claim 1, wherein the step of measuring the projection characteristics from multiple viewpoints comprises measuring the projection characteristics using multiple cameras positioned in different locations.

3. A method in accordance with claim 1, wherein the step of measuring the projection characteristics from multiple viewpoints comprises measuring the projection characteristics using a single camera moved sequentially between different locations.

4. A method in accordance with claim 1, wherein the step of computing rendering parameters for each projector comprises combining measured luminance profiles from multiple viewpoints to form a reflectance function that is dependent on viewing angle.

5. A method in accordance with claim 1, further comprising the step of repeatedly performing the step of computing rendering parameters for each projector using the estimated view-dependent projection parameters.

6. A method in accordance with claim 1, further comprising the step of periodically repeating the measuring, remapping, estimating, and computing steps.

7. A method in accordance with claim 1, further comprising the step of:
   tracking a view/gaze direction of a viewer of the composite image; and
   wherein the step of computing rendering parameters for each projector further comprises computing rendering parameters for each projector so as to reduce the view-dependent artifacts based upon the view/gaze direction.

8. A method in accordance with claim 1, further comprising the step of storing the estimated view-dependent projection parameters, and periodically updating the rendering parameters based upon the estimated view-dependent projection parameters.

9. A method in accordance with claim 1, further comprising the step of:
   the computer processing the image frame to define a plurality of image sub-frames, each image sub-frame representing a subset of the image frame, and each projector of the plurality of projectors projecting one of the image sub-frames in producing the composite image of the image frame.

10. A non-transitory computer-readable storage media comprising machine-readable instructions for causing a computing device including a processor and system memory to perform the steps of:
    receiving data representing measurements, from multiple viewpoints, of projection characteristics of a plurality of projectors producing a composite image of an image frame;
    remapping, for each projector, the projection characteristics from the multiple viewpoints to a common coordinate system;
    estimating view-dependent projection parameters for each projector based on the remapped projection characteristics; and
    computing rendering parameters for each projector based on the estimated view-dependent projection parameters so as to transform a projection data stream to the projector to reduce view-dependent artifacts.

11. A non-transitory computer-readable storage media in accordance with claim 10, wherein the step of measuring the projection characteristics from multiple viewpoints comprises one of measuring the projection characteristics using multiple cameras positioned in different locations, and measuring the projection characteristics using a single camera moved sequentially between different locations.

12. A non-transitory computer-readable storage media in accordance with claim 10, further comprising machine-readable instructions for causing a computing device to perform the step of:

tracking a view/gaze direction of a viewer of the composite image; and wherein the step of computing rendering parameters for each projector further comprises computing rendering parameters for each projector so as to reduce the view-dependent artifacts based upon the view/gaze direction.

13. A non-transitory computer-readable storage media in accordance with claim 10, wherein the step of computing the rendering parameters comprises combining measured luminance profiles from multiple viewpoints to form a reflectance function that is dependent on viewing angle.

14. A non-transitory computer-readable storage media in accordance with claim 10, further comprising machine-readable instructions for causing a computing device to perform the step of:

processing the image frame to define a plurality of image sub-frames, each image sub-frame representing a subset of the image frame, and each projector of the plurality of projectors projecting one of the image sub-frames in producing the composite image of the image frame.

15. A projection system, comprising:

a plurality of projectors, each oriented to project an image to a display location to produce a composite image of an image frame;

a plurality of camera locations, selected to allow a camera to obtain images of the display location from multiple vantage points; and a controller, including a computer processor and system memory, coupled to the projectors, the controller to receive image data from a camera at each camera location, to measure projection characteristics represented by the data for each projector, to remap the projection characteristics for each projector from the multiple vantage points to a common reference point, to estimate view-dependent projection parameters for each projector based on the remapped projection characteristics, and to compute rendering parameters for a projection data stream for each projector based on the estimated view-dependent projection parameters to reduce view-dependent artifacts.

16. A projection system in accordance with claim 15, further comprising a feedback camera at each camera location.

17. A projection system in accordance with claim 15, wherein the display location comprises multiple display locations, a discrete group of projectors being oriented to project a sub-image to one of the display locations.

18. A projection system in accordance with claim 15, wherein, to compute the rendering parameters, the controller combines measured luminance profiles from multiple vantage points to form a reflectance function that is dependent on viewing angle.

19. A projection system in accordance with claim 15, wherein each projector of the plurality of projectors projects a corresponding image sub-frame, each image sub-frame representing a subset of the image frame.

* * * * *